United States Patent [19]
Windsor

[11] 3,913,575
[45] Oct. 21, 1975

[54] EYE DROPPER DEVICE WITH A MIRROR
[76] Inventor: Robert K. Windsor, 417 Spruce St., Philadelphia, Pa. 19106
[22] Filed: Nov. 8, 1973
[21] Appl. No.: 414,013

[52] U.S. Cl. ................................................. 128/233
[51] Int. Cl.² .......................................... A61M 11/00
[58] Field of Search ...... 222/192; 128/21, 173, 233; 132/79 G, 83

[56] References Cited
UNITED STATES PATENTS

| | | | |
|---|---|---|---|
| 1,688,042 | 10/1928 | Gaess | 132/83 R |
| 2,106,254 | 1/1938 | Newell | 132/83 X |
| 2,382,771 | 8/1945 | Bowers | 128/233 |
| 3,640,274 | 2/1972 | Costello | 128/173 |

Primary Examiner—Robert B. Reeves
Assistant Examiner—Francis J. Bartuska
Attorney, Agent, or Firm—Seidel, Gonda & Goldhammer

[57] ABSTRACT

A device for dispensing eye drops comprising a bottle with a mirror attached thereto. In one position the mirror functions as a support for the bottle. In a second position the mirror enables the user to see the reflection of his eye as drops are dispensed from the bottle. Additionally, an attachment for an eye dropper bottle is disclosed. The attachment includes a mirror which in one position supports the bottle to which it is attached and in another position enables the user to see the reflection of his eye as drops are dispensed from the bottle.

13 Claims, 4 Drawing Figures

EYE DROPPER DEVICE WITH A MIRROR

This invention relates to a device for dispensing eye drops and an attachment therefor and more particularly to a device and an attachment which includes a mirror to enable the user of the device to see the reflection of his eye as drops are dispensed therefrom.

Eye dropping devices which comprise mirrors are known. Typically, the purpose of the mirror is to prevent the person using the device from blinking his eyes as the drops fall. Thus, the user of the device sees the reflection of his eye in the mirror. This obviates all desire for blinking or closing the eyes so that the drops can be applied to the eye as desired.

Generally, the invention relates to a device for dispensing eye drops comprising a bottle for holding the eye drops and a generally wedge shape member connected to the bottle for movement between first and second positions. The wedge shape member has a mirror on its front face. When the wedge shape member is in its first position it is under the bottle so that the bottle is supported on the rear face. When the wedge shape member is in its second position a user can see the reflection of his eye as he dispenses drops from the bottle.

Further, the invention also relates to an attachment for an eye dropper bottle comprising a first member to be connected to the bottle and a generally wedge shape member connected to the first member for movement between first and second positions. The wedge shape member has a mirror on its front face. When the wedge shape member is in its first position the mirror underlies the first member and when the wedge shape member is in its second position the mirror lies away from the underside of the first member.

The invention can best be described by referring to the drawing and the following specification where a number of embodiments thereof are illustrated. However, it should be understood that these embodiments are merely exemplary and the invention should not be limited thereby.

In the drawing, FIG. 1 is a perspective view of a device for dispensing eye drops in accordance with one form of the invention.

Figure 1:
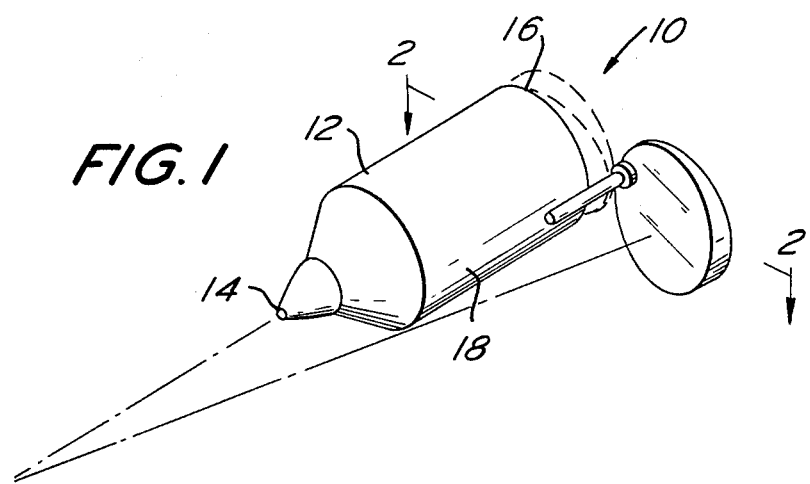

Now referring to the drawing in detail, a first presently preferred form of the invention is identified generally by the numeral 10 in FIG. 1. It includes a bottle 12 having an opening 14 at one end and a bottom 16 at its other end. The sides of the bottle may be defined by annular wall 18. Preferably, the bottle is comprised of a resilient plastic so that its sides can be squeezed to assist in the discharge of eye drops from opening 14.

An elongated pin 22 which may be integrally molded to the wall 18 of the bottle extends downwardly below the bottom 16. The pin is connected to a wedge shaped member 28. Member 28 has front and rear faces 30 and 32 with a sleeve 34 formed on the periphery of the front face.

A mirror 36 is mounted on front face 30 so that it is in generally facing relation to the opening 14 but set at an angle thereto. Preferably, the mirror is concave so that the eye will be in focus when the opening 14 is close to it so that the drops will be accurately aimed.

The distal end of pin 22 is pivotally received within sleeve 34. Thus, wedge shape member 28 can be moved in to and out of underlying relation to the bottle 12.

Figure 2:
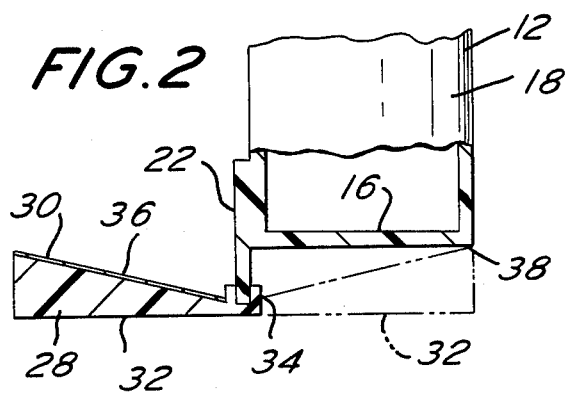
FIG. 2 is a sectional view taken along line 2—2 of FIG. 1.

When the wedge shape member is in the position shown in phantom in FIG. 2, the bottle is supported by rear surface 32. Point 38 which is on the front face and diametrically opposite to sleeve 34 is in supporting contact with the bottom wall 16.

The wedge shape member can be rotated to the position shown in solid lines in FIGS. 1 and 2. In this position a user of the device can see his eye reflected in the mirror and thereby prevent himself from blinking.

It is contemplated that other mechanisms for moving the wedge shape member from under the bottle to along side it can be used in addition to the pivot mechanism shown. Thus, it is conceivable that tracks could be provided on the underside of the bottle and the wedge shaped device be slipped along those tracks between positions under the bottle and along side it.

Furthermore, under some circumstances it may be desirable, for esthetic reasons, to provide an upwardly extending peripheral wall supported on the front face 30 of the wedge shaped member. The wall would extend around the mirror and be as high as point 38 on the front face so that its distal end would closely fit against the bottom surface 16 when the wedge shaped member 28 would be in the position illustrated in phantom in FIG. 2.

Figure 3:
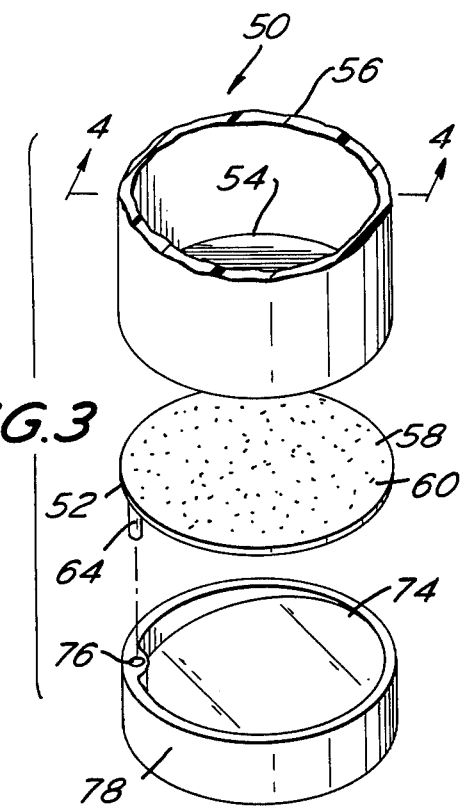
FIG. 3 is an exploded perspective view of another form of the invention.
Figure 4:
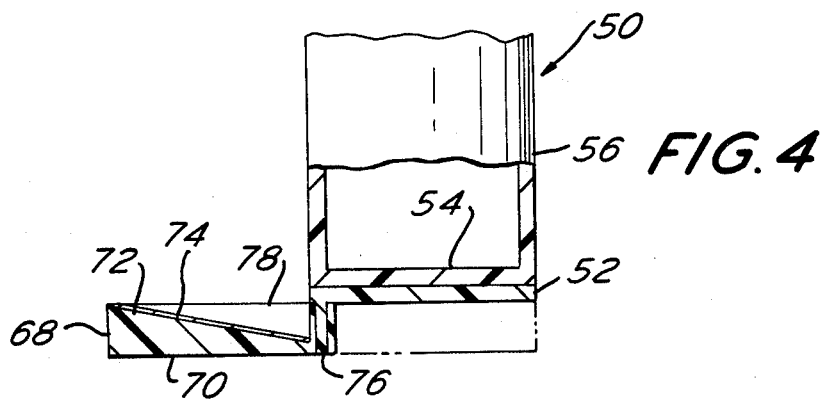
FIG. 4 is a sectional view taken along line 4—4 of FIG. 3.

Referring to FIGS. 3 and 4 a device which may be attached to the bottom of an eye dropper bottle is illustrated.

The device includes a first member 52 which may be coupled to the bottom wall 54 of an eye dropper bottle 56.

The first member may have an convenient configuration. As illustrated it is generally disc shaped and having a flat upper surface 58 which is covered with adhesive 60. The adhesive assures that the first member 52 will adhere to the bottom 54.

First member 52 supports a downwardly extending pivot pin 64.

A wedge shaped member 68 is provided. This member has substantially the same structure as that disclosed with respect to wedge shaped member 28. Thus, it includes a rear face 70, a front face 72 and a mirror 74. An upwardly directed sleeve 76 is supported by the wedge shaped member at the place where the front and rear faces join. The sleeve pivotally receives pin 64 so that the wedge shaped member can rotate under the first member 52 to support the bottle 56.

An upwardly extending peripheral wall is supported on the front face of the wedge shaped member. The distal end of wall 78 is of sufficient height so that it closely underlies the first member 52 when the wedge shaped member is rotated thereunder.

As explained earlier, the use of the peripheral wall 78 is not critical to the operation of the device. However, it is desirable for esthetic purposes and further because it protects the mirror from damage when the device is not in use.

It is contemplated that the attachment could comprise a number of different devices for connecting it to a eye dropper bottle. Thus, in lieu of a generally disc shaped first member, it is conceivable that the first member could have the shape of a cup so that it grabs the sides of the container. Further, it could have screw threads thereon which can be screwed into mating engagement with corresponding threads on the side of the bottle.

Furthermore, with respect to the pivotal connections between pin and sleeve 22 and 34 and pin and sleeve 64 and 76, it should be appreciated that the positions of the pin and sleeve in each instance could be reversed from the positions illustrated without in any way impairing the effectiveness of the device.

While the invention has been described with reference to certain forms and embodiments thereof, it is apparent that many other forms and embodiments will be obvious to those skilled in the art in view of the foregoing description. Thus, the scope of the invention should not be limited by that description but, rather, only by the claims appended hereto.

I claim:
1. A device for dispensing eye drops comprising
   a. a bottle for holding eye drops, said bottle having an axial opening at one end and a bottom at its other end,
   b. a generally wedge shaped member having a front face and a rear face, a mirror on said front face, said member having a first portion which is thinner than a diametrically opposite portion so that said front face is angled relative to the axis of said bottle,
   c. pivoting means at said first portion connecting said first portion of said member to said bottle for pivotal movement about an axis generally parallel to the axis of said bottle between first and second positions, said first position being under said bottle so that said bottle may be supported on said rear face of said member, said second position being alongside said bottle to enable a user to see the reflection of his eye in said mirror as drops are dispensed from said bottle in an axial direction.

2. A device according to claim 1 wherein said pivoting means comprises a pivot pin and a sleeve in which said pivot pin is rotatably mounted.

3. A device according to claim 1 wherein said pivoting means includes a pin, said pin being coupled to said bottle and extending downwardly therefrom, said wedge shaped member including a sleeve on the periphery of said mirror, and the distal end of said pin being pivotally received in said sleeve so that said mirror can be moved between said first and second positions.

4. A device according to claim 1 including a peripheral wall supported on said front face, the distal end of said wall closely underlying said bottle when said mirror is in said first position.

5. A device according to claim 1 wherein said pivoting means includes a first member coupled to said bottle, and means interconnecting said first member and said wedge shaped member for enabling pivotal movement of said wedge shaped member between said first and second positions.

6. A device according to claim 5 including a peripheral wall supported on said front face, the distal end of said wall closely underlying said first member and said bottle when said mirror is in said first position.

7. A device according to claim 5 wherein said pivoting means comprises a pivot pin and a sleeve pivotally mounted thereto.

8. A device according to claim 5 including adhesive means coupling said first member and said bottle.

9. An attachment for a bottle for dispensing eye drops comprising
   a. a first member capable of being coupled to the bottom of a bottle for holding eye drops,
   b. a generally wedge shaped member having a front face and a rear face, a mirror on said front face, said wedge shaped member having a first portion which is thinner than a diametrically opposite portion so that said front face will be angled relative to the axis of a bottle when said first member is coupled to such bottle,
   c. pivoting means at said first portion connecting said first portion of said wedge shaped member to said first member for pivotal movement about an axis generally parallel to the axis of a bottle when said first member is coupled to such bottle, said wedge shaped member being pivotable between first and second positions, said first position being underlying and facing said first member so that said attachment may be supported on said rear face of said wedge shaped member, and said second position being away from under said first member so that when said first member is attached to a bottle said wedge shaped member will be alongside said bottle to enable a user to see the reflection of his eye in said mirror as drops are dispensed from such bottle in an axial direction.

10. An attachment according to claim 9 including a peripheral wall supported on said front face, the distal end of said wall closely underlying said first member when said mirror is in said first position.

11. An attachment according to claim 9 wherein said pivoting means comprises a pivot pin and a sleeve pivotally mounted thereto.

12. An attachment according to claim 9 including adhesive means on the portion of said first member which engages a bottle.

13. An attachment according to claim 9 wherein said first member is disc shaped with a substantially flat surface for engagement with the bottom of a bottle.

* * * * *